(12) United States Patent
Nakano (10) Patent No.: US 9,544,715 B2
(45) Date of Patent: Jan. 10, 2017

(54) PORTABLE RADIO DEVICE MOVABLE WITH A SPEAKER-MICROPHONE, AND A WIRELESS COMMUNICATION METHOD

(71) Applicant: JVC KENWOOD Corporation, Yokohama-shi (JP)

(72) Inventor: Manabu Nakano, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 7 days.

(21) Appl. No.: 14/636,845

(22) Filed: Mar. 3, 2015

(65) Prior Publication Data
US 2015/0271627 A1   Sep. 24, 2015

(30) Foreign Application Priority Data
Mar. 21, 2014   (JP) .................................. 2014-059309

(51) Int. Cl.
  *H04W 40/00*   (2009.01)
  *H04W 4/00*    (2009.01)
  *H04W 40/02*   (2009.01)

(52) U.S. Cl.
  CPC ............. *H04W 4/008* (2013.01); *H04W 40/02* (2013.01); *Y02B 60/50* (2013.01)

(58) Field of Classification Search
  CPC ........ H04W 40/02; H04W 4/008; Y02B 60/50
  USPC ......................................................... 455/445
  See application file for complete search history.

(56) References Cited

U.S. PATENT DOCUMENTS

| | | | | |
|---|---|---|---|---|
| 2007/0129045 A1* | 6/2007 | Aerrabotu | .............. | H04B 1/406 455/343.5 |
| 2008/0113692 A1* | 5/2008 | Zhao | ....................... | H04B 15/02 455/574 |
| 2014/0342671 A1* | 11/2014 | Kim | ...................... | H04W 4/008 455/41.3 |
| 2015/0003440 A1* | 1/2015 | Lim | .................... | H04W 76/023 370/346 |
| 2015/0009844 A1* | 1/2015 | Kneckt | ............ | H04W 52/0209 370/252 |

FOREIGN PATENT DOCUMENTS

JP   2012-249102 A   12/2012

* cited by examiner

*Primary Examiner* — Timothy Pham
(74) *Attorney, Agent, or Firm* — Venable LLP; Michael A. Sartori; Laura G. Remus (57) ABSTRACT

During standby (waiting time), a microcomputer of a portable radio device monitors positional information based on the RSSI level (received signal strength) of receiving standby signals and GPS data. Then, when it is detected, based on the positional information based on the RSSI level (received signal strength) and the GPS data, that the radio device has entered an area outside a radio communication enabled area, namely an out-of-service area, the microcomputer carries out a power save processing.

2 Claims, 6 Drawing Sheets

PORTABLE RADIO DEVICE MOVABLE WITH A SPEAKER-MICROPHONE, AND A WIRELESS COMMUNICATION METHOD

CROSS-REFERENCE TO RELATED APPLICATION

This application is based upon and claims the benefit of priority from the prior Japanese Patent Application No. 2014-59309, filed on Mar. 21, 2014, the entire contents of which are incorporated herein by reference.

BACKGROUND

1. Field

The present invention relates to a portable radio device and a radio communication method and, more particularly, to a portable radio device, which is communicatable via Bluetooth (Bluetooth: registered trademark) between battery-powered speaker-microphones and which is movable with the speaker-microphone, and the radio communication method therefor.

2. Description of the Related Art

There are available portable radio devices, which are communicatable, via Bluetooth, between battery-powered speaker-microphones (or headsets) that are movable with their speaker-microphones. Among those portable radio devices, a portable radio device, for communicating with a partner station using a simplex (half duplex) scheme, transmits a transmitting voice of a user collected by a speaker-microphone, via Bluetooth communications, to the portable radio device and further wirelessly transmits the transmitting voice from the portable radio device to a partner station through a relay station. At this time, the partner station is in a receiving state. When, on the other hand, the partner station is in a transmission state, the portable radio device is switched to a receiving state. Then the transmitting voice wirelessly transmitted from the partner station is received by the portable radio device via the relay station, and the transmitting voice received is further transmitted to the speaker-microphone via Bluetooth communications. As a result, the transmitting voice is received and produced as voice sound by the speaker-microphone.

In a portable radio device with a speaker-microphone for business or commercial use among those equipped with the speaker-microphones using the simplex (half duplex) scheme, the user starts a call immediately after a push-to-talk (PTT) switch at the outset of a communication is operated. Thus, a transmission state starts upon activation of the PTT switch, and an attack time at which the modulation is actually feasible is defined accordingly. In the receiving, too, a received voice is suddenly outputted unlike a mobile phone where the received voice is outputted after a telephone calling operation has responded to an incoming call.

Accordingly, for such a portable radio device equipped with the speaker-microphone for business use, it is preferable that the voice communication is constantly enabled within a call possible zone (e.g., wireless service area or radio communication enabled area), and the headset profile (HSP) is used as the Bluetooth profile. As a result, the battery saving of the speaker-microphone is not carried out.

Also, in the portable radio device with the speaker-microphone for business use, the battery saving of the battery-powered speaker-microphone is not done although conventionally the transmission and the receiving in the radio communication do not need to be controlled in an area outside the call possible zone (an out-of-service area). In this case, the electric power of the battery-powered speaker-microphone is constantly consumed in the conventional portable radio device with the speaker-microphone for business use, thus causing a problem of reduced battery life.

In the light of this, conceivable for the purpose of reducing the power consumed by the speaker-microphone is a method where the power saving is carried out, except during a call, using the hands-free profile (HFP) of the Bluetooth profile.

Also conceivable for the purpose of reducing the power consumed by the speaker-microphone is employing a known method, as cited in Reference (1) of the following Related Art List, for reducing the power consumed by a mobile terminal device. A conventional method, cited in Reference (1) of the following Related Art List, for reducing the power consumed by a mobile terminal device, is as follows. That is, when the device is not in used for a predetermined duration of time with a function being turned on, it is determined that the function be turned off and, at that time, the position and the power use state or condition of the mobile terminal device are registered. Then, in the thus registered position, control is performed such that the mobile terminal device is in the registered power use state. As a result, the functions not in use are turned off and therefore the wasted power consumption is reduced. The position of the mobile terminal device is acquired by a known method using a global positioning system (GPS).

RELATED ART LIST (1) Japanese Unexamined Patent Application Publication No. 2012-249102.

However, in the method where the power saving of the speaker-microphone is carried out using the hands-free profile (HFP) of the Bluetooth profile, HFP is one prepared to suit a mobile phone (e.g., smartphone). Thus, the power saving function gets active as soon as the telephone calling operation starts. This causes a problem where the voice in a call may be clipped off at the beginning of the voice even though the Bluetooth communication is activated immediately after the activation of the PTT switch.

On the other hand, when the conventional method, cited in Reference (1) of the Related Art List, for reducing the power consumed by the mobile terminal device is applied to the power saving of the speaker-microphone, the positional information cannot be acquired at places like indoor spaces or the shadow of a building where no radio waves sent from satellites constituting the GPS cannot be received. This may possibly cause malfunction.

SUMMARY

The present invention has been made in view of the foregoing points. A purpose thereof is to provide a portable radio device and a radio communication method capable of performing the power saving of a speaker-microphone, independent of specific profiles, even in an out-of-service area and at places where the positional information acquired using the GPS cannot be acquired.

In order to resolve the foregoing problems, a portable radio device according to one embodiment of the present invention includes: a short-range communication unit that transmits and receives voice data to and from an external radio device, using short-range radio communication, the external radio device having a function of transmitting and receiving the voice data; a radio communication unit that receives a signal of a control channel wirelessly transmitted from a base station, during standby, and that wirelessly communicates between the portable radio device and a partner station with the base station serving as a relay station, during a call; and a control unit that enables the short-range communication unit to transmit and receive the voice data when the radio communication unit receives, from the base station, a signal valid to the portable radio device.

Another embodiment of the present invention relates also to a portable radio device. The portable radio device includes: a short-range communication unit that transmits and receives voice data to and from an external radio device, using short-range radio communication, the external radio device having a function of transmitting and receiving the voice data; a radio communication unit that receives a signal of a control channel wirelessly transmitted from a base station, during standby, and that wirelessly communicates between the portable radio device and a partner station with the base station serving as a relay station, during a call; a positional information acquiring unit that acquires positional information on a present position of the portable radio device; a positional information determining unit that determines by the radio communication unit, based on the positional information, whether or not the portable radio device is located within a predetermined area where the control channel is receivable; and a control unit that enables the short-range communication unit to transmit and receive the voice data when the radio communication unit receives, from the base station, a signal valid to the portable radio device or when it is determined by the positional information determining unit that the portable radio device is located within the predetermined area.

Still another embodiment of the present invention relates to a radio communication method. The radio communication method includes having a portable radio device enable a function of transmitting and receiving voice data to and from an external portable radio device, which is connected by a short-range radio communication unit and which transmits and receives voice data, when the portable radio device determines that a signal of a control channel transmitted from a base station, which relays communication between the portable radio devices, is a signal valid to the portable radio device.

Still another embodiment of the present invention relates also to a radio communication method. The radio communication method includes: having a portable radio device enable a function of transmitting and receiving voice data to and from an external portable radio device, which is connected by a short-range radio communication unit and which transmits and receives voice data, when the portable radio device determines that a signal of a control channel transmitted from a base station, which relays communication between the portable radio devices, is a signal valid to the portable radio device, or when the portable radio device determines that a result of measuring a position of positional information is in a range where the signal of the control channel transmitted from the base station is acquirable.

BRIEF DESCRIPTION OF THE DRAWINGS

Embodiments will now be described by way of examples only, with reference to the accompanying drawings, which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

A description is now given of one embodiment of the present invention with reference to Figures.

Figure 1:
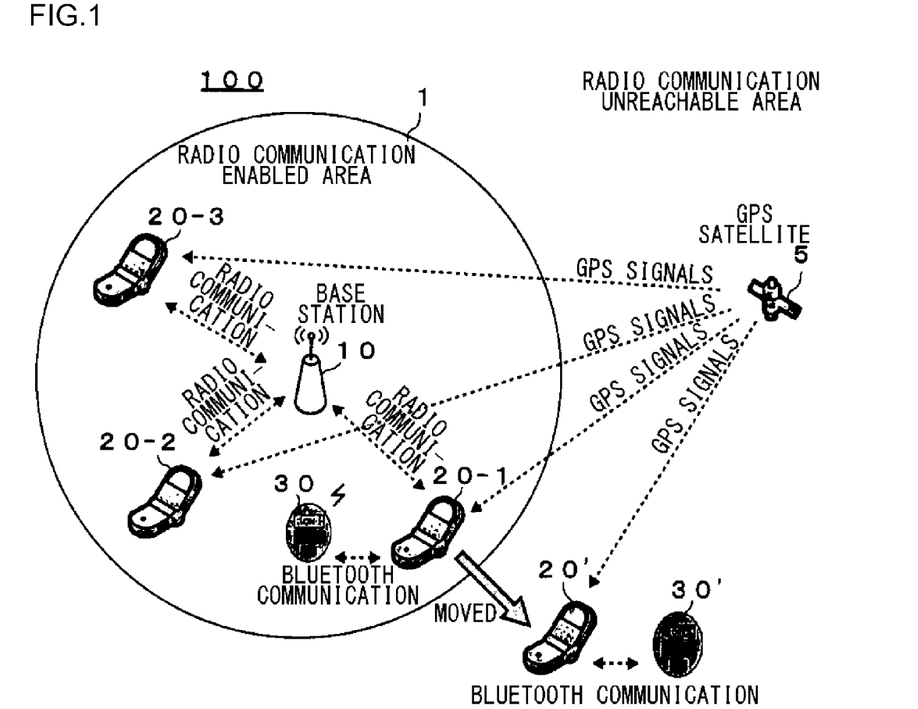
FIG. 1 is a schematic system configuration showing an exemplary radio communication system to which a portable radio device and a radio communication method according to an embodiment of the present invention are applied.

FIG. 1 is a schematic system configuration showing an exemplary radio communication system to which a portable radio device and a radio communication method according to an embodiment of the present invention are applied. In FIG. 1, a radio communication system 100 is a communication system in which portable radio devices 20-1, 20-2 and 20-3 according to the present embodiment can mutually communicate with each other with a base station 10 serving as a relay station. Here, the portable radio devices 20-1, 20-2 and 20-3 are located within a radio communication enabled area 1 of a base station 10. It is assumed herein that a simplex (half duplex) scheme is used in conducting a voice (audio) communication between the portable radio devices 20-1, 20-2 and 20-3. Also, the portable radio devices 20-1, 20-2 and 20-3 are movable.

In FIG. 1, the portable radio device 20-1 is communicatable, via Bluetooth, with a battery-powered speaker-microphone 30, which is a movable external radio device. A portable radio device 20' and a speaker-microphone 30' indicate how the portable radio device 20-1 is moved, together with the speaker-microphone 30, to an area outside the radio communication enabled area 1 (namely, a radio communication unreachable area in FIG. 1). Furthermore, as shown in FI. 1, the portable radio devices 20-1, 20-2 and 20-3 each has a function of receiving GPS signals relayed by a satellite or satellites (hereinafter referred to as a GPS satellite or GPS satellites) 5 that constitutes/constitute a part of GPS, no matter whether each of the portable radio devices 20-1, 20-2 and 20-3 is located within or outside the radio communication enabled area 1.

The radio communication system 100 is a wireless communication system using a trunking method. In the trunking method, the portable radio devices 20-1, 20-2 and 20-3 are each constantly receiving a control channel (ch) from the base station 10 during standby (waiting time).

In the radio communication system 100 using the trunking method, each portable radio device places a call by using a control ch via the base station 10, then moves to a voice channel (ch) not used by both the portable radio device and a partner radio device, and performs verbal (voice) communication. After having moved to the voice ch, any one of the portable radio devices 20-1, 20-2 and 20-3 transmits a message and then another user (a plurality of users possible) receives the message, when a single message transmission is used. Thus, even while the two portable radio devices 20-1 and 20-2 alternately converse with each other with the base station 10 used as the relay station in a group of the portable radio devices 20-1, 20-2 and 20-3 located within the radio communication enabled area 1, the third portable radio device 20-3 can intercept the conversation taking place between the portable radio devices 20-1 and 20-2.

In this case, even though the portable radio device 20-1 stops the transmission while the portable radio device 20-2 is still transmitting messages, the transmission from the base station 10 continues. Thus, the received signals continue to arrive without interruption. If continues the state where no one transmits messages, the base station 10 stops relaying the messages. As no signals of the voice ch is sent from the base station 10, the portable radio devices 20-1, 20-2 and 20-3 each searches for a control ch and then receives the control ch.

Figure 2:
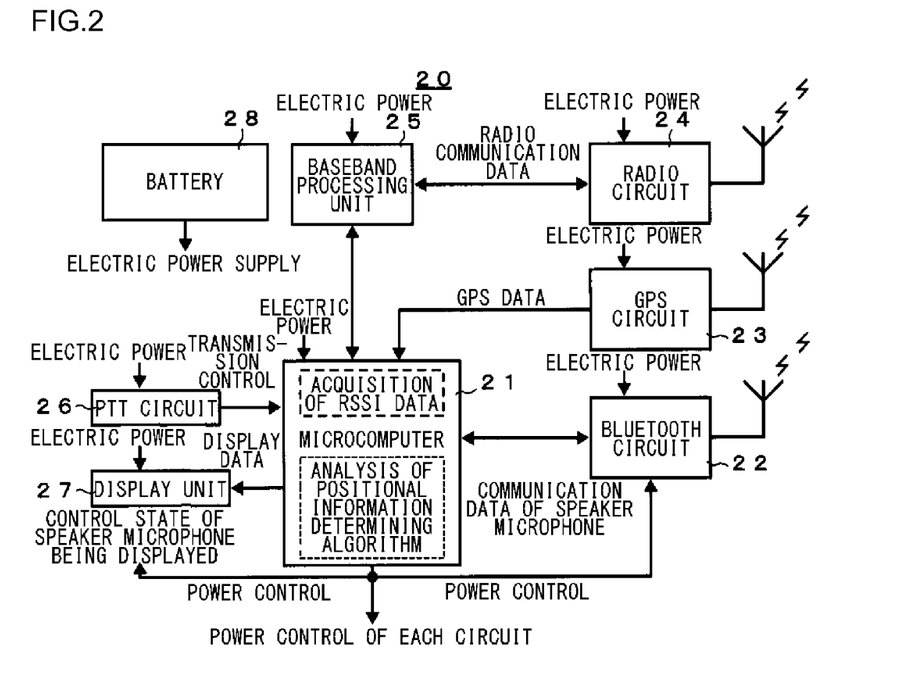
FIG. 2 is a block diagram showing a structure of the portable radio device of FIG. 1 according to an embodiment.

A description is now given of a structure of a portable radio device according to an embodiment of the present invention. FIG. 2 is a block diagram showing a structure of the portable radio device according to an embodiment of the present invention. Since the portable radio devices 20-1, 20-2 and 20-3 have the same structure, they are hereinafter generically referred to as "portable radio device 20" or "portable radio devices 20", and a description thereof will be given as that of "portable radio device 20" or "portable radio devices 20".

As shown in the block diagram of FIG. 2, the portable radio device 20 is configured such that a microcomputer 21 can carry out two-way communication with a Bluetooth circuit 22 and a baseband processing unit 25. Also, the microcomputer 21 receives GPS data, fed from a GPS circuit 23, and transmission control signals, sent from a PTT circuit 26, and then supplies display data to a display unit 27 so as to control the portable radio device in a unified manner. Also, the microcomputer 21 operates by receiving the electric power from a battery 28 in the same as the Bluetooth circuit 22, the GPS circuit 23, a radio circuit 24, the baseband processing unit 25, the PTT circuit 26 and the display unit 27 operate thereby.

The Bluetooth circuit 22 constitutes a short-range communication unit in an embodiment of the present invention. Also, the Bluetooth circuit 22, which is used to communicate via Bluetooth with the speaker-microphone 30, receives speaker-microphone communication data sent from the speaker-microphone 30 and then supplies the received speaker-microphone communication data to the microcomputer 21. Data to be transmitted from the portable radio device 20 to the speaker-microphone 30 is supplied to the Bluetooth circuit 22 from the microcomputer 21. Then, the data is converted into a predetermined signal form for use in Bluetooth communication, and the converted data is transmitted to the speaker-microphone 30.

The GPS circuit 23 constitutes a positional information acquiring unit in the present disclosure. The GPS circuit 23 receives GPS signals sent from the GPS satellites 5, then converts the GPS signals into GPS data, and supplies the GPS data to the microcomputer 21. Based on the GPS data supplied from the GPS circuit 23, the microcomputer 21 conducts a known analysis algorithm for determining the positional information to calculate the present position (the latitude and longitude) of the portable radio device 20. Further, the microcomputer 21 references a table for a radio communicatable area in which the present position thereof is registered and then determines whether or not the portable radio device 20 is located within the radio communication enabled area 1. The radio circuit 24 receives radio signals of the control ch wirelessly transmitted directly from the base station 10 or voice signals wirelessly transmitted over the voice ch from a partner station with the base station 10 used as the relay station. The radio signals or voice signals received are then converted into wireless voice data of a predetermined intermediate frequency, for example, and the wireless voice data is supplied to the baseband processing unit 25.

The baseband processing unit 25, together with the radio circuit 24, constitutes a radio communication unit in the present disclosure. The baseband processing unit 25 converts the wireless voice data supplied into a baseband signal and processes this baseband signal by using a known processing, and then supplies the thus processed signal to the microcomputer 21. If an input signal supplied from the baseband processing unit 25 is a display signal, the microcomputer 21 converts the input signal into display data and supplies the display data to the display unit 27 so as to have the display data displayed thereby. If the input signal supplied therefrom is voice data, the microcomputer 21 supplies the voice data to the Bluetooth circuit 22, where the voice data is converted into a predetermined signal form suitable for the Bluetooth communications, and the signal thus converted by the Bluetooth circuit 22 is transmitted to the speaker-microphone 30 so as to produce voice sound through a speaker portion.

The microcomputer 21 acquires a received field strength (received signal strength indication (RSSI) data) from the input signal supplied from the baseband processing unit 25. When the transmission control signal is fed from the PTT circuit 26 upon activation of the PTT switch, transmitting voice data, which has been collected by a microphone portion of the speaker-microphone 30 and then transmitted via Bluetooth communications, is fed through the Bluetooth circuit 22, and the microcomputer 21 further wirelessly transmits the transmission voice data to the partner station through the baseband processing unit 25 and the radio circuit 24. The display unit 27 displays a control condition of the speaker-microphone 30. The microcomputer 21 constitutes an arithmetic operator (calculator), a disconnection request transmitting unit and a positional position determining unit of the present disclosure.

Figure 3:
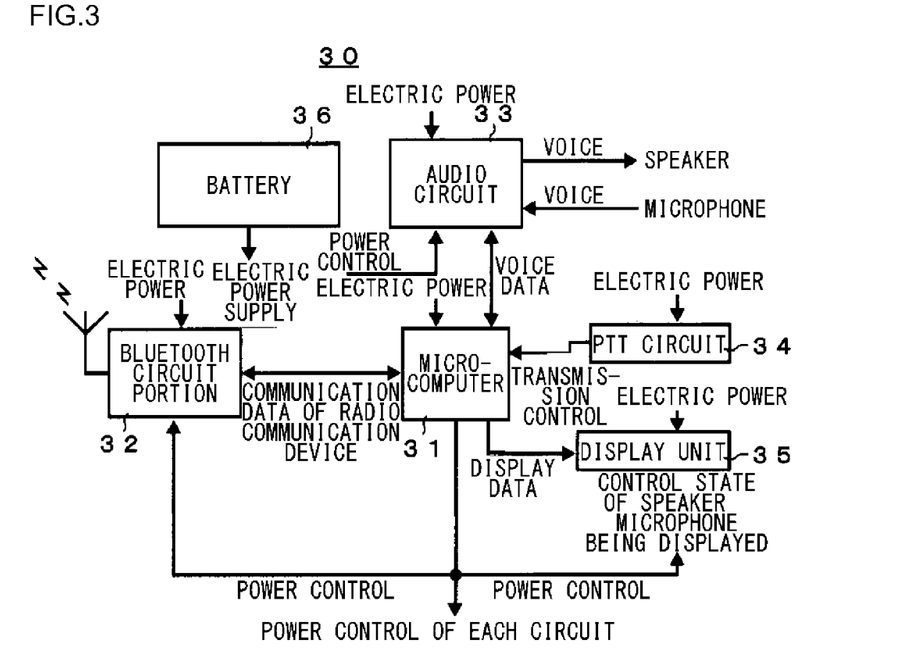
FIG. 3 is a block diagram showing a structure of a speaker-microphone of FIG. 1.

A description is now given of the speaker-microphone. FIG. 3 is a block diagram showing a structure of the speaker-microphone according to an embodiment. In FIG. 3, the speaker-microphone 30 includes a microcomputer 31, a Bluetooth circuit 32, an audio circuit 33, a PTT circuit 34, and a display unit 35. The speaker-microphone 30 is configured such that these components thereof operate by receiving the electric power from a battery 36. Though omitted in FIG. 3, the speaker-microphone 30 further includes a speaker portion and a microphone portion.

The Bluetooth circuit 32 communicates via Bluetooth with the portable radio device 20. The Bluetooth circuit 32 receives signals (e.g., the received voice and various requests) transmitted from the portable radio device 20 and supplies them to the microcomputer 31, and transmits transmitting voice signals fed from the microcomputer 31 to the portable radio device 20.

When the signal fed from the Bluetooth circuit 32 is the received voice data, the microcomputer 31 has the audio circuit 33 convert the signal into a received voice of analog signal and has the speaker portion produce the analog signal as voice sound. When the signals fed from the Bluetooth circuit 32 are various requests, the microcomputer 31 carries out predetermined processings according to the requests. When the transmission control signal is fed from the PTT circuit 26 upon activation of the PTT switch, voice data of digital signal obtained, when the transmitting voice data collected by the microphone portion of the speaker-microphone is converted by the audio circuit 33, is supplied to the microcomputer 31. The microcomputer 31 then transmits this voice data to the Bluetooth circuit 32 and has the Bluetooth circuit 32 transmit the voice data to the portable radio device 20. Also, the microcomputer 21 supplies display data to the display unit 35 and has the display unit 35 display the display data. The display unit 35 displays a control condition of the speaker-microphone and the like.

A detailed description is now given of the portable radio device according to an embodiment.

Figure 4:
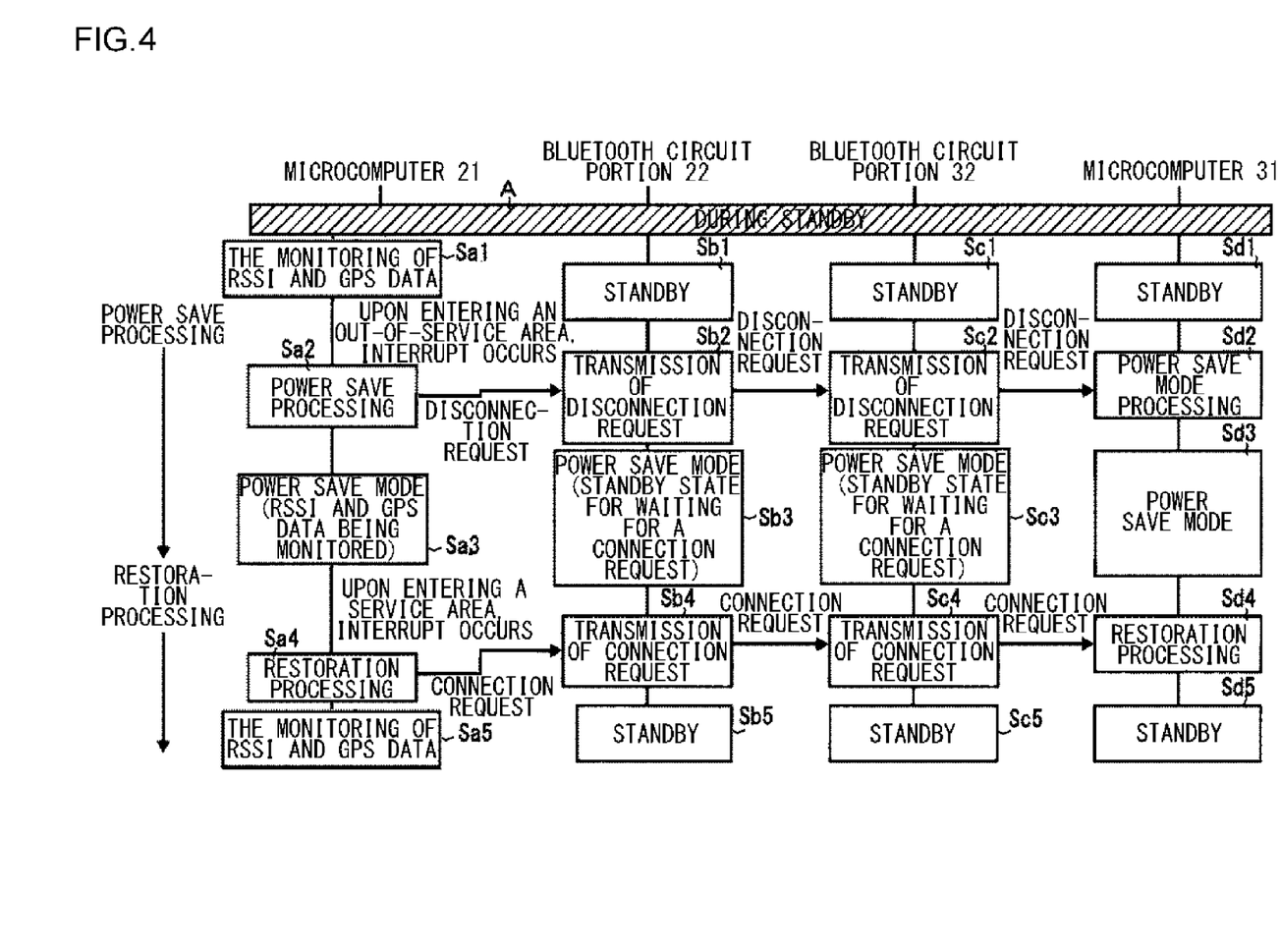
FIG. 4 is a sequence diagram to explain operations of a portable radio device and a speaker-microphone according to an embodiment of the present invention.

FIG. 4 is a sequence diagram to explain operations of a portable radio device and a speaker-microphone according to an embodiment of the present invention. FIG. 2 mainly shows operations of the microcomputer 21 and the Bluetooth circuit 22 in the portable radio device 20 of FIG. 2 and operations of the Bluetooth circuit 32 and the microcomputer 31 in the speaker-microphone 30 of FIG. 3.

A description is first given of an operation during standby (waiting time) or during a standby state (mode). As discussed earlier, during standby, the portable radio device 20 receives a standby signal, which is constantly transmitted from the base station 10 over the control ch, and supplies the standby signal to the microcomputer 21 via the radio circuit 24 and the baseband processing unit 25. As a result, during standby, the microcomputer 21 of the portable radio device 20 monitors the RSSI level (received signal strength) of the receiving-standby signal and the positional information based on the GPS data (Step Sa1). If it is detected, based on the RSSI level (received signal strength) of the standby signal and the positional information based on the GPS data, that the portable radio device 20 has entered an area outside the radio communication enabled area 1 of the base station (see FIG. 1) (i.e., an out-of-service area), the microcomputer 21 carries out a power save processing of the speaker-microphone (Step Sa2).

Figure 5A:
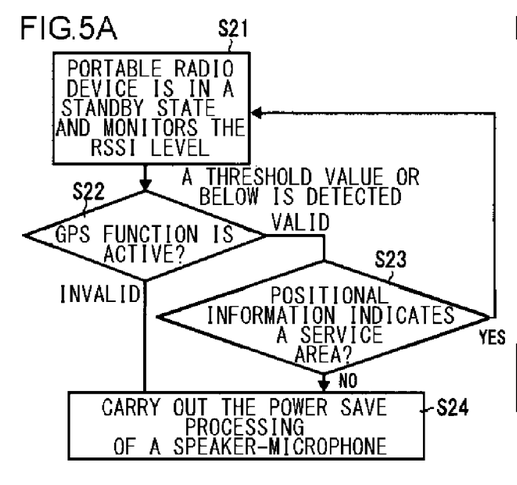
FIG. 5A and FIG. 5B are flowcharts showing the respective operations of major components of FIG. 4.

In conjunction with FIG. 5A, a detailed description is further given of the processing at Steps Sa1 and Sa2 during standby. First, in a standby state, the microcomputer 21 monitors whether or not the RSSI level (received signal strength) of the receiving-standby signal is less than or equal to a threshold value (Step S21, which corresponds to Step Sa1 of FIG. 4). If the RSSI level thereof is less than or equal to the threshold value, the microcomputer 21 continues to determine whether a GPS function is active or not (Step S22). That is, at Step S22, the microcomputer 21 determines that the GPS function is active (valid), when the user operates on the GPS function of the portable radio device; the microcomputer 21 determines that the GPS function is not active (invalid), when he/she does not use the GPS function thereof.

When it is determined, at Step S22, that the GPS function is invalid, the RSSI level (received signal strength) of the receiving-standby signal is determined to be less than or equal to the threshold value). With this determination result, the control ch is not received and it is therefore determined that the portable radio device is located in the out-of-service area. Hence, the microcomputer 21 carries out the power save processing of the speaker-microphone 30 (Step S24, which corresponds to Step Sa2 of FIG. 4).

When, on the other hand, it is determined, at Step S22, that the GPS function is valid, the microcomputer 21 references, for example, the registration table of the radio communication enabled area by using the positional information calculated based on the GPS data, and then determines whether or not the calculated positional information indicates that the portable radio device is located within the radio communication enabled area (namely, within a service area (call possible zone) or not) (Step S23). If the positional information indicating the service area can be acquired, the processing step is returned to Step S21 and then resumed is monitoring whether or not the RSSI level (received signal strength) of the standby signal is less than or equal to the threshold value. In this case, the portable radio device 20 cannot receive the control ch because the portable radio device 20 is in the shadow of a building, for example. However, it is determined, from the GPS data, that the portable radio device is located within the radio communication enabled area 1 and that the control ch can be received again, and therefore the processing at Step S21 continues.

When, on the other hand, at Step 23 the microcomputer 21 determines that the calculated positional information indicates an area outside the radio communication enabled area (i.e., an out-of-service area), the power save processing of the speaker-microphone 30 is carried out (Step S24, which corresponds to Step Sa2 of FIG. 4). That is, when it is determined, at Step S22, that the GPS function is valid and both when the RSSI level (received signal strength) of the receiving-standby signal is less than or equal to the threshold value and when the positional information indicates an out-of-service area, the microcomputer 21 carries out the power save processing of the speaker-microphone 30. This is because, in this case, the portable radio device 20 is in a state where the transmission and receiving function is lost, and therefore the electric power will be wasted if a transmission trigger (transmitter button, etc.) and the speaker-microphone 30 for controlling the telephone calling are still in an operable (standby) state then.

Now, refer back to FIG. 4 to continue the explanation. If the power save processing is to be carried out (Step Sa2), the microcomputer 21 outputs a disconnection request. Subsequent to a standby operation (Step Sb1) so far, the Bluetooth circuit 22 transmits the disconnection request, sent from the microcomputer 21, to the speaker-microphone 30 (Step Sb2). When the Bluetooth circuit 32 of the speaker-microphone 30 receives the aforementioned disconnection request during the previous standby operation (Step Sc1), the Bluetooth circuit 32 instructs the microcomputer 31 to switch the on-going standby operation (Step Sd1) to the execution of the power save processing (Step Sd2), by an interrupt processing. This allows the speaker-microphone 30 to start a power save mode where the feeding of electricity from the battery 36 to the speaker-microphone 30 is cut (Step Sd3).

During a power save period of the speaker-microphone 30, the Bluetooth circuits 22 and 32 are each in a state of waiting for a connection request (Steps Sbs and Sc3). The microcomputer 21 of the portable radio device 20 now monitors whether or not the portable radio device 20 has entered the radio communication enabled area 1 of the base station (see FIG. 1) (i.e., the service area), based on the positional information calculated from the RSSI level (received signal strength) of the standby signal and the GPS data (Step Sa3). When it is detected that the portable radio device 20 is located within the service area, the microcomputer 21 carries out a power restoration processing of the speaker-microphone 30 (Step Sa4) and outputs the connection request.

Figure 5B:
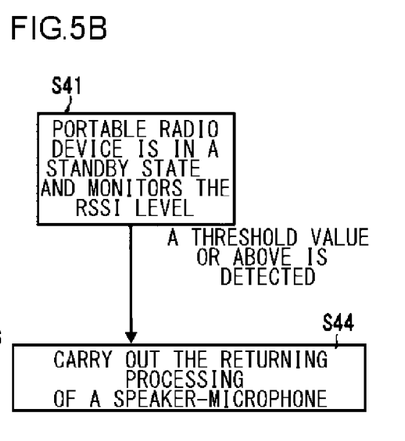

In conjunction with FIG. 5B, a detailed description is further given of the processing at Steps Sa3 and Sa4 during standby. First, in a standby state of the portable radio device 20, the microcomputer 21 monitors whether or not the RSSI level (received signal strength) of the receiving-standby signal is greater than or equal to the threshold value (Step S41). If the RSSI level thereof is greater than or equal to the threshold value, the power restoration processing of the speaker-microphone 30 is carried out (Step S44, which corresponds to Step Sa4 of FIG. 4).

Now, refer back to FIG. 4 to continue the explanation. If the power restoration processing is to be carried out (Step Sa4), the microcomputer 21 outputs a connection request. Subsequent to a power save operation (Step Sb3) so far, the Bluetooth circuit 22 transmits the connection request, sent from the microcomputer 21, to the speaker-microphone 30 (Step Sb4). When, subsequent to the power save operation (Step Sc3) so far, the Bluetooth circuit 32 of the speaker-microphone 30 receives the aforementioned connection request (Step Sc4), the Bluetooth circuit 32 instructs the microcomputer 31 to switch the power save operation (Step Sd3) to the execution of the power restoration processing (Step Sd4) by an interrupt processing.

As result, the electric power restarts to be supplied to the speaker-microphone 30 from the battery 36, and the speaker-microphone 30 is set to a standby state (Step Sd5). Also, the Bluetooth circuits 22 and 32 are each set to a standby state (Step Sb5 and Step Sc5), and the microcomputer 21 monitors again the positional information based on the RSSI level (received signal strength) of the receiving-standby signal and the GPS data.

Thus, during standby, the portable radio device 20 according to the present embodiment maintains the wireless connection status with the speaker-microphone 30, as long as the positional information based on the GPS data indicates that the portable radio device 20 is located within the service area, even though the RSSI level of the standby signal of the control ch is less than or equal to the threshold value because of the portable radio device being in the shadow of a building, for example, and it is therefore determined that the receiving-standby signal cannot be received. Also, if, at Step S41, the RSSI level of the standby signal of the control ch is greater than or equal to the threshold value and it is determined that the control ch can be received, the wireless connection status with the speaker-microphone 30 is maintained. This is because it is determined that the transmission and the receiving are still possible considering (1) a case where the GPS signals cannot be received due to the reason why the portable radio device 20 may be located inside a building or (2) a case where the standby signal can be received through reflection and the like even though the portable radio device 20 is located in an out-of-service area.

The description has been given of a procedure for determining whether the portal radio device 20 is in the service area or not, by the RSSI level of the standby signal. However, this should not be considered as limiting. For example, whether or not the portable radio device 20 is in the service area may be determined based on whether or not a signal valid to the portable radio device is received. More specifically, whether or not it is in the service area may be determined based on whether or not there is a signal synchronous with the standby signal. Or, for example, whether or not it is in the service area may be determined based on whether or not the bit error ratio (BER) of the standby signals is less than or equal to a threshold value.

A description is next given of an operation during receiving or during a receiving state (mode).

As explained in the radio system employing the trunking method, "during receiving" or "during a receiving state (mode)" is a state where a call placed over the control ch is received from the partner station 20 in a standby state over the control ch and then the voice signal from the partner station is being received after the communication channel has moved to the voice ch. Thus, no power save processing of the speaker-microphone 30 is carried out during receiving.

If, in the trunking method, the signals of the voice ch cease to arrive for a predetermined length of time, the channel is returned to the control ch and the operation mode is set to a standby state.

The Bluetooth circuit 22 transmits the received voice data to the speaker-microphone 30. The Bluetooth circuit 32 of the speaker-microphone 30 receives the voice data sent from the portable radio device 20 and then supplies the received voice data to the microcomputer 31. The microcomputer 31 has the speaker portion sound out the input voice data, through the audio circuit 33, as the received voice.

A description is next given of an operation during transmission or during a transmission state (mode).

In the trunking method, the portable radio device 20 will not be in a transmission state unless either the control ch or the voice ch is received. Thus it is presupposed in the trunking method that the speaker-microphone 30 is not in a power save state. Similar to the processing carried out during receiving, no power save processing of the speaker-microphone 30 is carried out during transmission, too.

If the portable radio device 20 terminates the transmission and then a predetermined length of time has passed without receiving any voice call response from the partner station, the base station 10 terminates a relay processing. When the signals no longer exist in the voice ch, the communication channel returns to the control ch, and the portable radio device 20 is in a standby state.

The transmitting voice is collected by the microphone portion of the speaker-microphone 30 and is fed to the microcomputer 31 through the audio circuit 33 as the transmitting voice data. The microcomputer 31 supplies this transmitting voice to the Bluetooth circuit 32 so as to be transmitted to the portable radio device 20. The Bluetooth circuit 22 receives the transmitting voice data, transmitted from the Bluetooth circuit 32, and supplies it to the microcomputer 21. While the PTT switch of the portable radio device 20 is pressed down, the microcomputer 21 converts the transmitting voice data, fed from the Bluetooth circuit 22, into a predetermined signal form through the baseband processing unit 25 and the radio circuit 24.

Subsequent to this, all of the following processings are carried out during a transmission period. That is, during the transmission period, the voice is inputted to the microcomputer 31, the transmitting voice data is transmitted from the Bluetooth circuit 32, the transmitting voice data is received by the Bluetooth circuit 22, and the microcomputer 21 outputs the thus inputted transmitting voice data to the baseband processing unit 25. As the transmission of voice is terminated after this, the microcomputer 31, the Bluetooth circuit 32 and the Bluetooth circuit 22 are all in their standby states. Then, the PTT switch of the portable radio device 20 is no longer pressed down and the portable radio device 20 is switched to the receiving mode.

Figure 6:
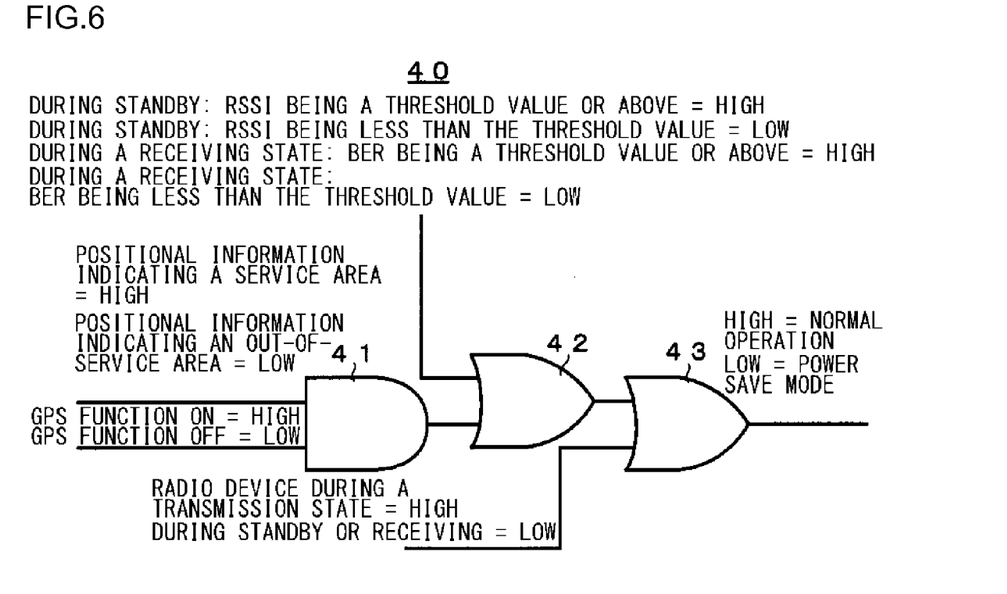
FIG. 6 is a logic diagram showing an exemplary power save determining circuit.

Determining when to invoke the power save processing of the speaker-microphone 30 by the microcomputer 31 can be done sofwarewise. However, this is should not be considered as limiting and, for example, this may be configured by a logic circuit as shown in FIG. 6. FIG. 6 is a circuit diagram showing an exemplary power save determining circuit. In FIG. 6, a power save determining circuit 40 is configured by a two-input AND circuit 41 and two-input OR circuits 42 and 43. The two-input AND circuit 41 outputs an AND signal indicating a logical product (AND) of a determination signal and a GPS function determination signal. Here, the determination signal is either an "H" level signal or an "L" level signal wherein the determination signal is at "H" level when the positional information calculated by the microcomputer 21 from the GPS data indicates a service area, and the determination signal is at "L" level when it indicates an out-of-service area. Similarly, the GPS function determination signal is either an "H" level signal or an "L" level signal wherein the GPS function determination signal is at "H" level when the GPS function is turned on (enabled), and the GPS function determination signal is at "L" level when the GPS function is turned off (disabled).

The two-input OR circuit 42 outputs an OR signal indicating a logical sum (OR) of a signal, which is inputted to one of input terminals of the two-input OR circuit 42, and an output signal of the AND circuit 41, which is inputted to the other thereof. An RSSI determination signal is inputted to one of the input terminals of the two-input OR circuit 42. Here, the RSSI determination signal is at "H" level when the RSSI of the receiving-standby signal of the control ch is greater than or equal to the threshold value, and the RSSI determination signal is at "L" level when it is less than or equal to the threshold value.

The two-input OR circuit 43 outputs an OR signal indicating a logical sum (OR) of a mode determination signal, which is inputted to one of input terminals of the two-input OR circuit 43, and an output signal of the OR circuit 43, which is inputted to the other thereof. This OR signal is outputted as a power save mode signal from the two-input OR circuit 43. Here, the mode determination signal goes "H" when the portable radio device 20 is in a transmission state, and the mode determination signal goes "L" when it is in a standby state or a receiving state. The power save mode signal indicates a power save mode when it is at "L" level, and the power save mode signal indicates a normal operation when it is at "H" level. Thus, where the portable radio device 20 is in a standby state, the OR circuit 43 outputs a signal indicative of a power save mode when the GPS function is turned off and when the RSSI of the receiving-standby signal is less than or equal to the threshold value. Also, where the portable radio device 20 is in a standby state, the OR circuit 43 outputs a signal indicative of a power save mode when the GPS function is turned on and when the positional information based on the GPS data indicates an out-of-service area in addition to the above condition.

As described above, by employing the portable radio device 20 according to the present embodiment, the information as to whether or not the portable radio device 20 is located within the radio communication enabled area 1 is accurately obtained based on the information, such as the RSSI level (received signal strength) of the receiving-standby signal, acquired by receiving the signals from the base station 10 and the positional information acquired from the received GPS data. If, during standby, the portable radio device 20 is located outside the radio communication enabled area 1, the power save mode is carried out where the feeding of electricity from the battery to the speaker-microphone for receiving and transmitting the voice signals via Bluetooth communications is cut. Also, when it is determined, based on at least one of the above two sets of information, that the portable radio device, which is controlled under the power save mode, has entered the radio communication enabled area 1, the operation mode is returned to a power mode where the speaker-microphone is powered by the battery.

Thus, by employing the portable radio device 20 according to the present embodiment, the power saving can be achieved independent of the Bluetooth profiles and without the need of issuing a power saving command using a serial communication profile or without the need of using the hands-free profile. Also, the commands used in the power saving and the power restoration according to the present embodiment are a disconnection request and a connection request only. Thus, the trigger such as a voice transmission request is no longer required, so that the power saving can be automatically carried out by his/her own terminal device only.

Moreover, according to the present embodiment, two or more sets of information, including the information, such as the RSSI level (received signal strength) of the receiving-standby signal, acquired by receiving the signals sent from the base station 10 and the positional information acquired from the received GPS data, are used simultaneously. This resolves the problem concerning the accuracy in the determination of the position of the portable radio device located indoors or in the shadow of a building, when only the GPS signals are used while the device is in the power saving mode, so that the malfunction can be prevented.

The present invention has been described based upon illustrative embodiments. These exemplary embodiments are intended to be illustrative only and not limiting. For example, a short-range radio communication scheme, such as WiFi, other than the Bluetooth may also be used for the communications between the portable radio device and the speaker-microphone.

What is claimed is:

1. A portable radio device comprising:
 a short-range communication unit that transmits and receives voice data to and from an external radio device, using short-range radio communication, the external radio device having a function of transmitting and receiving the voice data;
 a radio communication unit that receives a signal of a control channel wirelessly transmitted from a base station, during standby, and that wirelessly communicates using a half duplex scheme between the portable radio device and a partner station with the base station serving as a relay station, during a call;
 a positional information acquiring unit that acquires positional information on a present position of the portable radio device;
 a positional information determining unit that determines, based on the positional information, whether or not the portable radio device is located within an area where reception of the control channel by the radio communication unit is enabled; and
 a control unit that disables a function, of transmitting and receiving the voice data, in the short-range communication unit, when a signal strength of the signal of the control channel received by the radio communication unit is less than or equal to a predetermined value and when it is determined by the positional information determining unit that the portable radio device is not located within the predetermined area.

2. A radio communication method including having a portable radio device for half duplex wireless communication disable a function of transmitting and receiving voice data to and from an external portable radio device, which is connected to the portable radio device by a short-range radio communication unit and which transmits and receives voice data, when a signal strength of the signal of the control channel transmitted from a base station, which relays communication between the portable radio device and a partner station, is less than or equal to a predetermined value and when the portable radio device determines that a result of measuring a position of positional information is not in a range where the signal of the control channel transmitted from the base station is acquirable.

\* \* \* \* \*